(12) United States Patent
Ellis

(10) Patent No.: US 8,979,099 B1
(45) Date of Patent: Mar. 17, 2015

(54) FOLDABLE AND WIDTH ADJUSTABLE PALLET JACK

(71) Applicant: Bruce G. Ellis, Kingston, GA (US)

(72) Inventor: Bruce G. Ellis, Kingston, GA (US)

( * ) Notice: Subject to any disclaimer, the term of this patent is extended or adjusted under 35 U.S.C. 154(b) by 35 days.

(21) Appl. No.: 13/755,635

(22) Filed: Jan. 31, 2013

Related U.S. Application Data

(60) Provisional application No. 61/592,899, filed on Jan. 31, 2012.

(51) Int. Cl.
*B62D 21/00* (2006.01)
*B66F 9/14* (2006.01)
*B66F 9/065* (2006.01)

(52) U.S. Cl.
CPC ............... *B66F 9/142* (2013.01); *B66F 9/065* (2013.01)
USPC ..................................................... 280/43.12

(58) Field of Classification Search
CPC .................................. B66F 9/14; B66F 9/065
USPC .................................... 280/43.12, 651, 47.34
See application file for complete search history.

(56) References Cited

U.S. PATENT DOCUMENTS

| | | | | |
|---|---|---|---|---|
| 2,625,278 A | * | 1/1953 | Sensenbaugh | 414/563 |
| 3,272,287 A | * | 9/1966 | Easton | 187/244 |
| 3,356,241 A | * | 12/1967 | Varilek | 414/671 |
| 3,567,054 A | * | 3/1971 | Emke | 414/639 |
| 3,601,423 A | * | 8/1971 | Goodacre | 280/43.12 |
| 3,843,147 A | | 10/1974 | Fredricson | |
| 3,854,748 A | * | 12/1974 | Goodacre | 280/43.12 |
| 3,982,767 A | | 9/1976 | Larsson et al. | |
| 4,272,220 A | * | 6/1981 | Garcia | 414/607 |
| 4,589,669 A | * | 5/1986 | Kedem | 280/43.12 |
| 4,607,997 A | * | 8/1986 | Asano | 414/667 |
| 4,969,794 A | * | 11/1990 | Larsen | 414/495 |
| 5,354,080 A | * | 10/1994 | Jones | 280/43.12 |
| 5,403,024 A | * | 4/1995 | Frketic | 280/43.12 |
| 5,807,060 A | * | 9/1998 | Hamlik | 414/668 |
| 6,065,926 A | * | 5/2000 | Knapp | 414/667 |
| 6,742,790 B2 | * | 6/2004 | Seagraves et al. | 280/47.34 |
| D530,878 S | | 10/2006 | Ruppert et al. | |
| 7,114,906 B1 | | 10/2006 | Baumgarner et al. | |
| 7,475,887 B2 | | 1/2009 | Hartmann et al. | |
| 7,641,011 B2 | * | 1/2010 | Fridlington et al. | 180/68.5 |
| 7,731,206 B2 | * | 6/2010 | Borrmann | 280/47.34 |
| 7,976,032 B1 | * | 7/2011 | Dockins et al. | 280/43.12 |
| 8,336,913 B1 | * | 12/2012 | Aaseby et al. | 280/767 |
| 8,528,700 B2 | * | 9/2013 | Gobyn et al. | 187/237 |
| 2003/0197351 A1 | | 10/2003 | Burger et al. | |
| 2006/0181039 A1 | * | 8/2006 | Fridlington et al. | 280/43.12 |
| 2008/0152471 A1 | * | 6/2008 | Polvilampi | 414/671 |
| 2008/0232944 A1 | * | 9/2008 | Kim | 414/667 |
| 2011/0318153 A1 | * | 12/2011 | Johnson | 414/667 |

* cited by examiner

*Primary Examiner* — Hau Phan
*Assistant Examiner* — Jacob Meyer
(74) *Attorney, Agent, or Firm* — Robert C. Montgomery; Montgomery Patent & Design

(57) ABSTRACT

A foldable and portable pallet jack for transporting pallets comprises width-adjustable and folding forks. The skid forks adjust to different sized pallets or materials. The skid forks also fold upright against the handle section of the pallet jack allowing it to be compactly transported and stored. With the forks in a horizontal and locked position, the pallet jack provides normal lifting and transporting of heavy pallets or material in a conventional manner.

13 Claims, 6 Drawing Sheets

FOLDABLE AND WIDTH ADJUSTABLE PALLET JACK

RELATED APPLICATIONS

The present invention was first described in U.S. Patent Provisional No. 61/592,899 filed on Jan. 31, 2012 the entire disclosures of which are incorporated herein by reference.

FIELD OF THE INVENTION

The presently disclosed subject matter is directed toward pallet jacks. More particularly the present invention relates to a foldable and portable pallet jack having skid forks that width adjust to fit different sized pallets or materials.

BACKGROUND OF THE INVENTION

Most every consumer products, food products, raw materials, or other packaged goods at one (1) time or another are transported on a shipping pallet. The ubiquitous shipping pallet provides an easy, low cost, and very flexible means to move packaged goods, heavy equipment and large groupings of materials quickly and efficiently.

Because of their myriad uses and efficiency shipping pallets can be moved by lift trucks, tow motors, and specialized pallet conveyances. However, in stores, smaller warehouse spaces, and other relatively confined areas shipping pallets are usually moved by a pallet jack.

A pallet jack is a rather specialized piece of machinery having a set of wheels, a set of arms for mating with a shipping pallet, and a lifting mechanism for lifting the arms. An operator positions the pallet jack with the arms lowered and inserted into a shipping pallet. The arms are raised, which raises the shipping pallet and the material carried on the shipping pallet. The pallet jack is then moved to another location using the wheels. The arms are then lowered, the shipping pallet is placed on the floor, and the pallet jack is then removed from the shipping pallet. Often pallet jacks are hydraulically or pneumatically operated so as to enable one person to move a great deal of material, sometimes thousands of pounds at a time, with little effort or risk of injury.

One of the relatively few drawbacks of pallet jacks is that a pallet jack can easily weigh several hundred pounds. This makes them rather difficult to move from one (1) location to a remote location. This is a particular problem when one (1) pallet jack must be frequently moved. If the pallet jack is not at the correctly location the delivery personnel who relied on it may have to move delivered goods one (1) piece at a time. Often a difficult, time consuming, and dangerous task.

In view of the foregoing there exists a need for a lightweight, easily transportable pallet jack. Beneficially such a pallet jack would be strong enough to move a great deal of weight while remaining easy to relocate. Preferably such a pallet jack would be made of aluminum for strength and lightweight. Ideally such a strong, lightweight pallet jack would eliminate the need for a pallet jack at the receiving location since delivery workers could simply bring their own. To that end such a pallet jack would ideally have foldable skid arms that can adjust to varying widths to fit pallets of different sizes. Beneficially the skid arms of such a pallet jack would fold up out of the way and would remain upright and out of the way when being moved.

SUMMARY OF THE INVENTION

The principles of the present invention provide for lightweight and easy to transport pallet jacks. Such pallet jacks can be configured to be sufficiently strong to move a lot of weight while remaining easy to move. Preferably the inventive pallet jacks are comprised of aluminum, have skid arms that are width-wise adjustable and that fold and remain upright.

A pallet jack that is in accord with the present invention includes a base platform and a base frame that extends over the base platform and further extends below the base platform. A pump assembly is mounted between the base frame and the base platform such that the pump assembly can raise and lower the base frame. The base platform is attached to a rear wheel assembly by a swivel connection. A support plate is attached to and extends away from the bottom of the base frame. The support plate includes a generally vertical, flat front having an upper edge.

The inventive pallet jack further includes a first fork bracket and a second fork bracket that extend from the support plate. A first fork prong is attached to the first fork bracket by a first hinge while a second fork prong is attached to the second fork bracket by a second hinge. A handle operates the pump assembly such that pumping the handle pushes the base frame upward. The first fork prong and the second fork prong vertically fold upright on the first and second hinges.

In practice the handle may pivotally connect to the pump assembly and it may include a valve control handle that can release pressure in the pump assembly to lower the base frame. A grip may be placed around the valve control handle.

Beneficially, the first fork bracket and the second fork bracket have inverted "U"-shaped front ends that attach to the support plate. The support plate may then include a plurality of recessed bracket seats along the upper edge for receiving the first and second fork brackets. The width between the first and second fork prongs can then be adjusted by locating the first and second fork brackets into different bracket seats.

It is beneficial that at least the first fork prong have a rear fork roller near the first hinge such that the rear fork roller can pivot into contact with a floor when the first fork prong is vertical. A locking pin can then pass through the first fork prong and the first fork bracket to lock the first fork prong when it is horizontal. A protective cover may be placed over the flat front and the upper edge, and a fastener can pass through the first fork bracket to lock the first fork bracket into a bracket seat. In addition, at least the first fork prong may include a front fork roller.

To assist keeping the fork prongs vertical a hinged support post may be attached to the base frame such that the support post can pivot vertically. Then, a securing member can be used to entrap the vertical support post and fork prongs.

An inventive pallet jack includes a base platform and a base frame that extends over the base platform and further extends below the base platform. A pump assembly is mounted between the base frame and the base platform such that the pump assembly can raise and lower the base frame. The base platform is attached to a rear wheel assembly by a swivel connection. A support plate is attached to and extends away from the bottom of the base frame. The support plate includes a generally vertical, flat front having an upper edge configured with at least three (3) bracket seats.

A first fork bracket extends from a first bracket seat while a second fork bracket extends from a second bracket seat. A first fork prong attaches to the first fork bracket and a second fork prong attaches to the second fork bracket. The inventive pallet jack further includes a handle for operating the pump assembly such that pumping the handle pushes the base frame upward. The separation between the first fork prong and the second fork prong depends on the first bracket seat and on the second bracket seat.

In practice the handle may include a valve control handle that is in fluid communication with the pump assembly such that the valve control handle can release pressure to lower the base frame. The handle may further include a grip around the valve control handle.

Preferably the first fork prong is attached to the first fork bracket by a first hinge and the second fork prong is attached to the second fork bracket by a second hinge. The first fork prong and the second fork prong can respectively fold vertically upright on the first and second hinges. In practice at least the first fork prong may include a rear fork roller that is adjacent to the first hinge such that the rear fork roller pivots into contact with a floor when the first fork prong is vertical.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
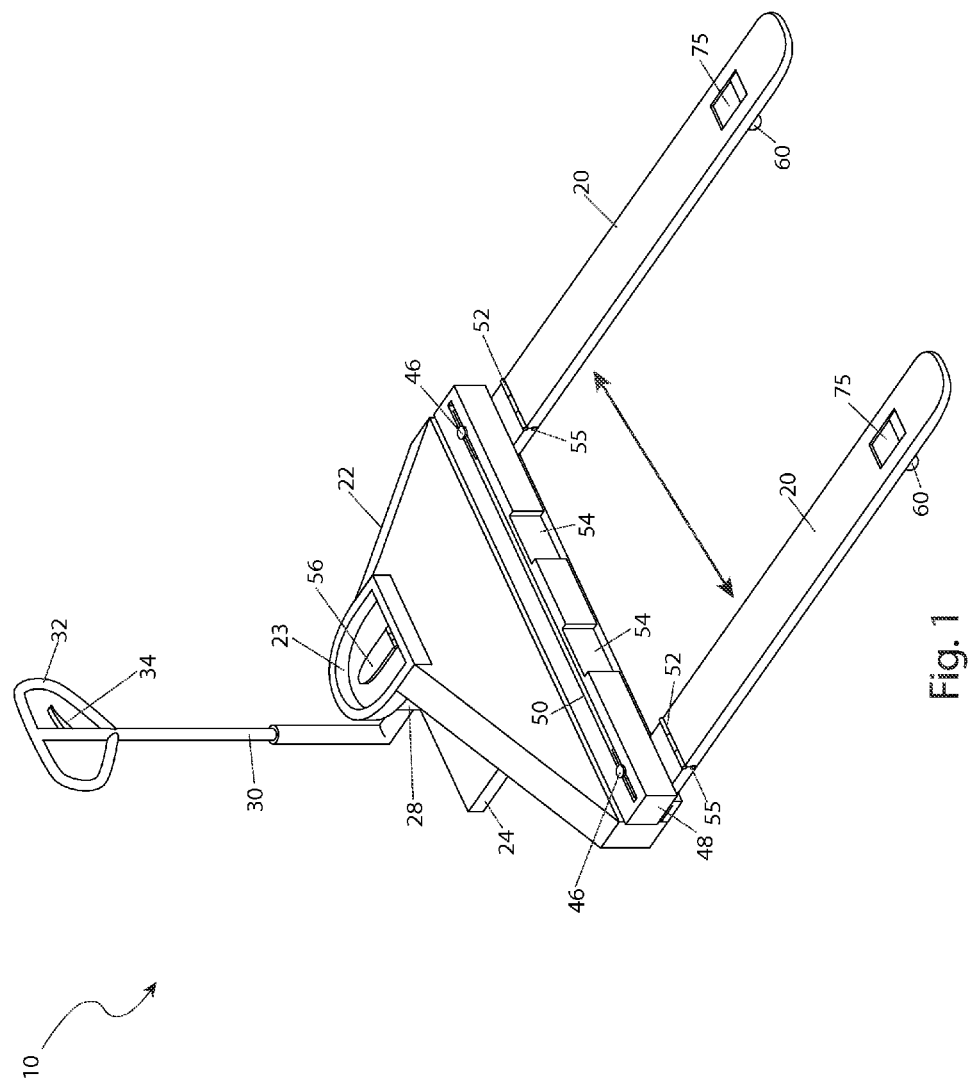
FIG. 1 is a front perspective view of a foldable and width-adjustable pallet jack 10 that is in accord with a preferred embodiment of the present invention.

DESCRIPTIVE KEY 10 foldable and width-adjustable pallet jack
20 fork prong
22 base frame
23 support post recess
24 base platform
26 rear wheel
28 pump assembly
30 handle
32 grip
34 valve control handle
36 support plate
38 bracket seat
40 fork bracket
42 threaded aperture
44 fastener aperture
46 threaded fastener
48 cover
50 slot
52 hinged connection
53 hinge pin
54 fork recess
55 locking pin
56 support post
57 support post hinge
58 securing member
60 front fork roller
61 pocket
62 rear fork roller
70 first push rod
71 second push rod
72 lever arm
74 pivot pin
75 roller opening
76 clevis

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention will be disclosure with reference to a certain embodiment which is illustrated in the accompanying drawings. Those figures depict a foldable and width-adjustable pallet jack, hereinafter described as a foldable pallet jack 10.

Figure 2:
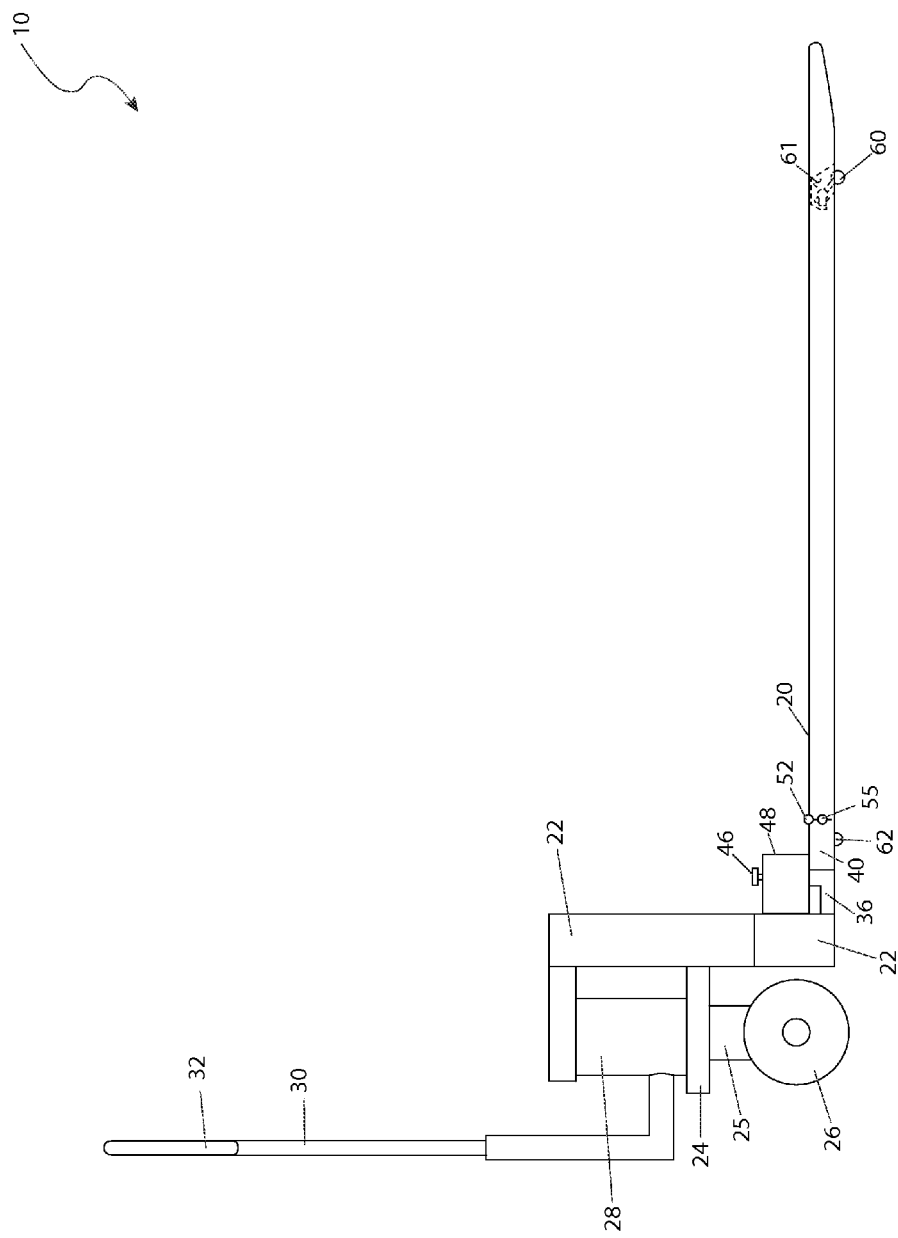
FIG. 2 is a side view of the foldable and width-adjustable pallet jack 10 shown in FIG. 1.

Referring to FIGS. 1 and 2, the foldable pallet jack 10 is intended for engaging, lifting, and transporting a load such as a loaded shipping pallet. The foldable pallet jack 10 has two (2) fork prongs 20 that are laterally movable relative to one (1) another along a base frame 22. This provides an adjustable fork prong width. The fork prongs 20 are configured to be insertable into a conventional shipping pallet. Finally, the fork prongs 20 are selectively foldable to remain upright.

The base frame 22 is configured to be height-adjustable via a hydraulic pump assembly 28. The pump assembly 28 is operated by "pumping" an elongated handle 30 up and down relative to a base platform 24. As is described in more detail subsequently this lifts and lowers the fork prongs 20 and any load attached thereto. The foldable pallet jack 10 includes at least one (1) rotatably rear wheel assembly 26 that is connected below the base platform 24 via a swivel connection 25. The pump assembly 28 is mounted on the base platform 24. As is typical with such pumps the pump assembly 28 includes a hydraulic jack having an internal piston (not shown) which is selectively pumped up and released down by the handle 30. The handle 30 is beneficially pivotally connected to the pump assembly 28.

Figure 6:
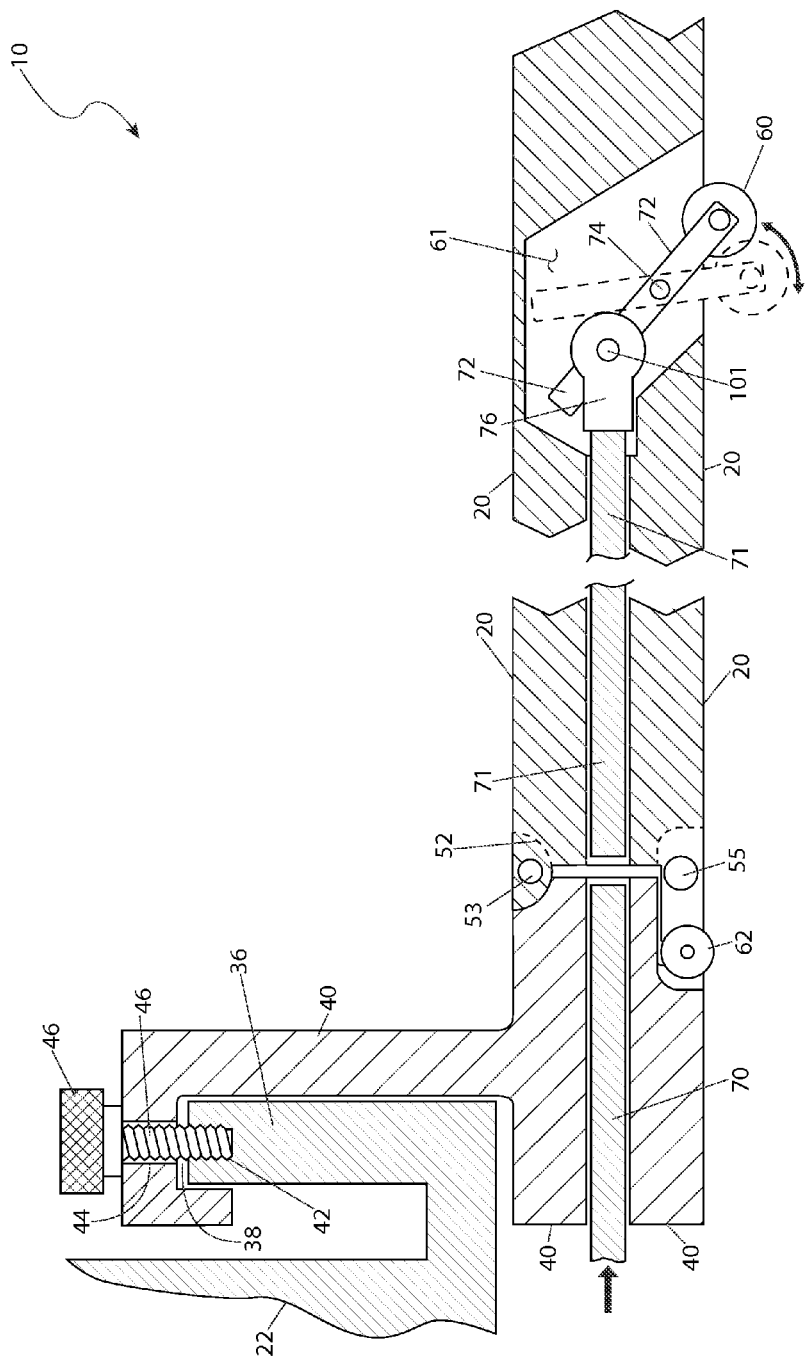

The top of the pump assembly 28 is affixed to the bottom rear of the base frame 22. Since the pump assembly 28 is on the base platform 24, as the handle 30 is pumped the pump assembly 28 pushes the base frame 22 up. Turning now to FIG. 6, the pump assembly 28 also pushes on a first pushrod 70. As is described in more detail subsequently, pushing on the first push rod 70 causes a front fork roller 60 to pivot to lift the front of the fork prongs 20 off the floor. Consequently, pumping the handle 30 causes the pump assembly 28 to synchronously lift both the base frame 22 and the fork prongs 20.

The top of the handle 30 includes a grip 32 that surrounds a valve control handle 34. As is typical for pallet jacks the valve control handle 34 selectively actuates a valve (not shown for clarity) that is in fluid communication with the pump assembly 28. In the foldable pallet jack 10 moving the valve control handle 34 releases the pressure in the pump assembly 28, which lowers the base frame 22 and the fork prongs 20.

Figure 3:
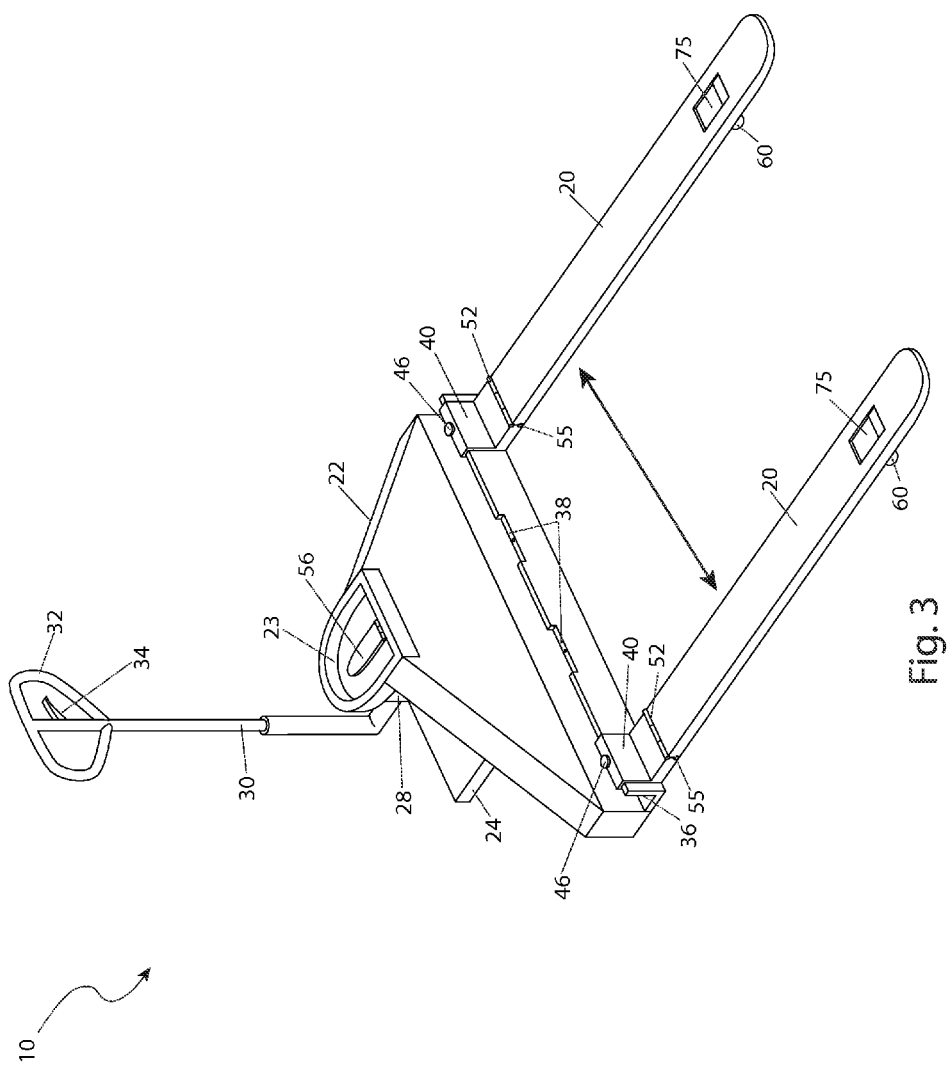
FIG. 3 is a front perspective view of the foldable and width-adjustable pallet jack 10 shown in FIGS. 1 and 2, but depicted with a cover 48 removed to show a width-adjustment mechanism.
Figure 4:
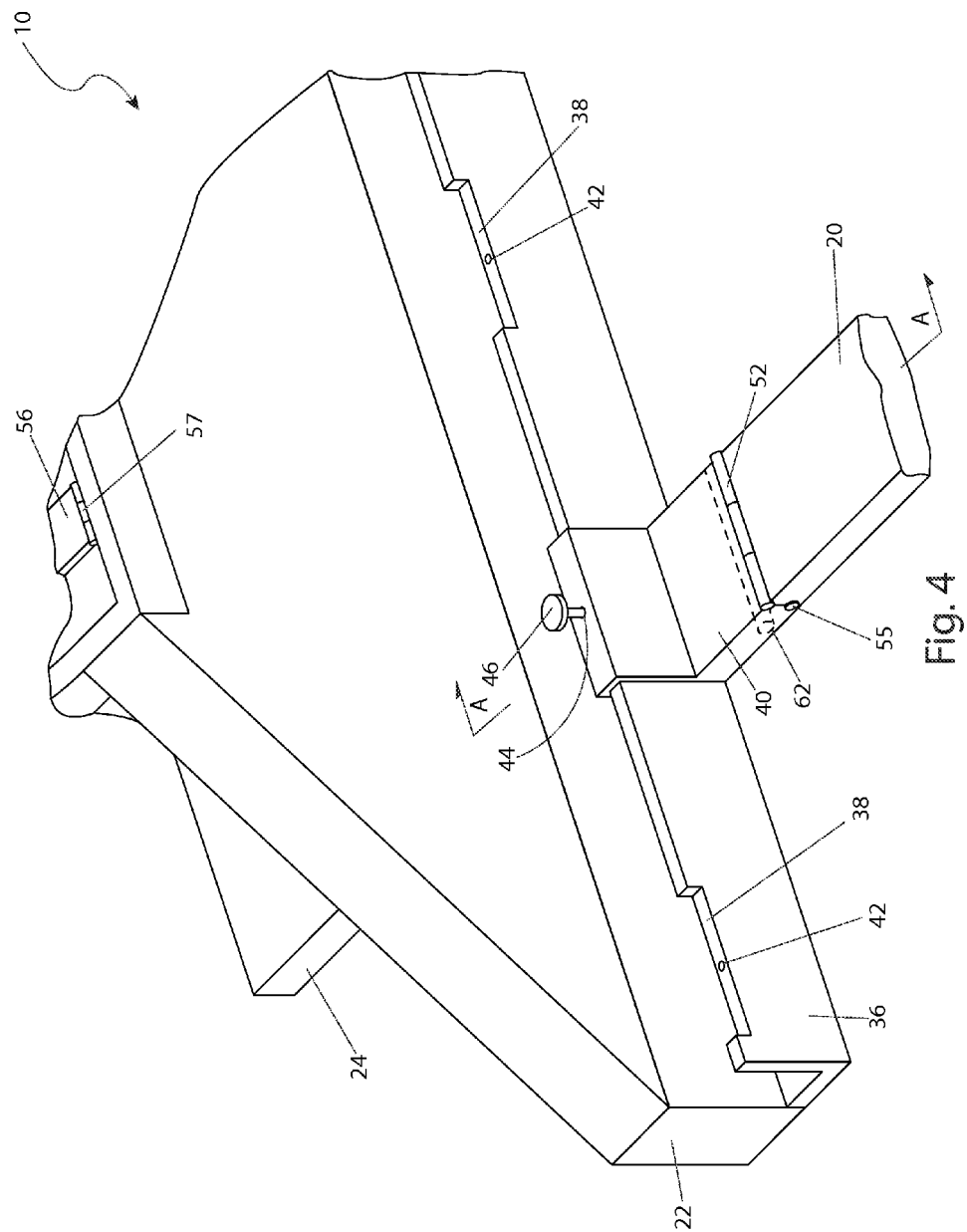
FIG. 4 is a fragmentary perspective view of the width-adjustment mechanism shown in FIG. 3.

Refer now to FIGS. 1, 3, and 4, which present various views of the foldable pallet jack 10. The spatial positions of the fork prongs 20 are width adjustable. To that end the foldable pallet jack 10 has a width adjustment mechanism that includes a support plate 36 that is affixed to the lower front end of the base frame 22. The width adjustment mechanism also includes a fork bracket 40 to which the proximal end of each fork prong 20 attach. The support plate 36 extends away from the base frame 22 to a generally vertical, flat front surface having an upper edge that is disposed away from the base frame 22.

The support plate 36 is configured such that its upper edge forms a plurality of recessed bracket seats 38 for receiving the fork brackets 40. To that end the support plate 36 forms a width-wise channel with the base frame 22. The bracket seats 38 establish a set of selectable seat positions, and thus selectable fork prongs 20 widths. Typically, the bracket seats 38 are spaced twenty inches (20 in.) or twenty-seven inches (27 in.) apart.

Each of the fork brackets 40 includes an inverted "U"-shaped front end that is configured to ride along the support plate 36. When a fork bracket 40 is positioned in a bracket seat 38 the "U"-shaped upper end of the fork bracket 40 fits within a bracket seat 38 such that the vertical portions of the fork bracket 40 rests upon and are supported by the vertical surfaces of the support plate 36 while the top of the inverted "U"-shaped rests on the upper edge of the support plate 36.

As best shown in FIGS. 4 and 6, each bracket seat 38 includes a vertically disposed threaded aperture 42. That aperture 42 receives a threaded fastener 46 that passes through a vertical fastener aperture 44 in the fork bracket 40. The threaded fastener 46 is preferably a knob-stud device or a similar equivalent that enables a user to tighten the threaded fastener 46 without tools. Tightening the threaded fastener 46 secures the fork bracket 40 within the bracket seat 38. Consequently, the fork prongs 20 are securely attached to the base frame 22.

Figure 5:
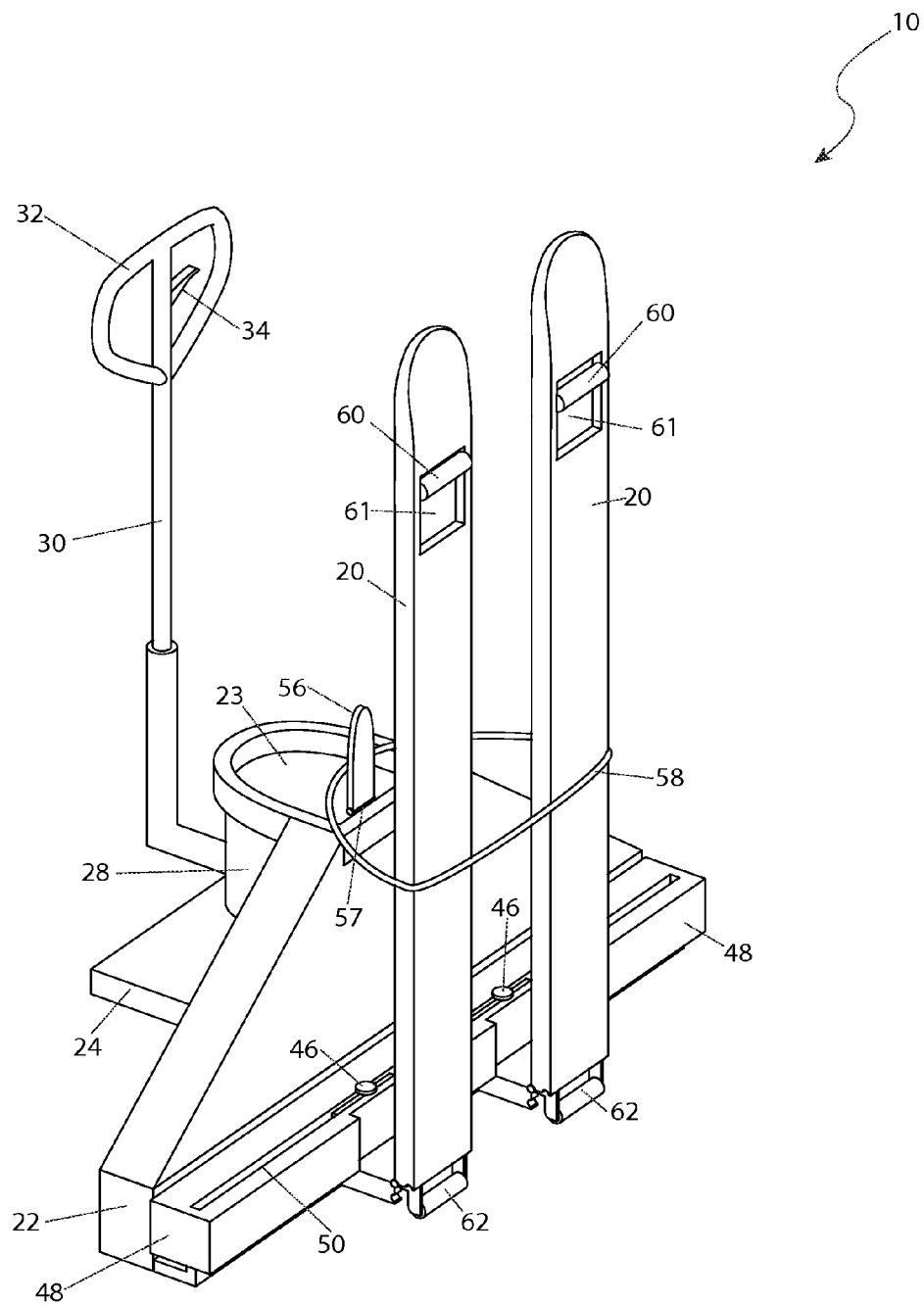
FIG. 5 is a front perspective view of the foldable and width-adjustable pallet jack 10 shown in FIGS. 1 and 2, but depicted with both fork prongs 20 raised; and, FIG. 6 is a section view of a fork prong 20 of the foldable and width-adjustable pallet jack 10 taken along section line A-A of FIG. 4.

As best shown in FIG. 5, the foldable pallet jack 10 also includes an attachable cover 48 that covers and protects the width adjusting mechanism as well as the front of the base frame 20. As shown, the cover 48 includes an elongated slot 50 that allows the fastener 46 to move laterally with the lateral movement of the fork bracket 40. It is envisioned that the fastener 46 may include an integral washer feature or other stop feature which prevents its complete removal from the fork bracket 40.

Referring now primarily to FIGS. 4, 5, and 6, the fork prongs 20 are foldable with respect to the base frame 22. To that end the proximal end of each fork bracket 40 extends horizontally outward short distances to an associated hinge 52. Each hinge 52 includes a hinge pin 53 which extends laterally through an upper part of an associated fork prong 20 and an upper part of each fork bracket 40 (best shown in FIG. 6). The hinge pin 53 allows its associated fork prong 20 to pivot upward to a generally vertical position.

The hinge 52 is suitably strong and durable to adequately bear a load such as a fully loaded pallet. To assist the hinge 52 the foldable pallet jack 10 further includes a locking pin 55 that adds stability when the fork prong 20 is horizontal. The locking pin 55 is located below and parallel with the hinge pin 53. When the fork prong 20 is horizontal the locking pin 55 passes through lower apertures through the fork prong 20 and fork bracket 40. Thus when the fork prong 20 is horizontal both the locking pin 55 and the hinge pin 53 support the load. However, the locking pin 55 is removable. When the locking pin 55 is removed the fork prong 20 can pivot upward as previously noted. When the locking pin 55 is in place a secondary locking element, such as a hair-pin cotter, a spring plunger, or the like may be used to retain the locking pin 55 in position.

Turning now primarily to FIGS. 5 and 6, each fork prong 20 includes a rear fork roller 62 at its proximal end. When the fork prong 20 is horizontal the rear fork rollers 62 fold into an associated fork bracket pocket 61. This prevents the rear fork rollers 62 from interfering when the fork prongs 20 are under a load. When the fork prongs 20 are raised to a vertical position the rear fork rollers 62 pivot about the hinge pin 53 and extend out of the pocket 61 and into contact with the floor. This supports and stabilizes the front of the foldable pallet jack 10 and allows the foldable pallet jack 10 to be easily rolled.

Referring now to FIGS. 1 and 4-5 as required, the cover 48 includes a pair of fork recesses 54 that are disposed along its front. The fork recesses 54 align with the narrowest pair of bracket seats 38 and are sized to receive the proximal ends of the fork prong 20 when the fork prongs 20 are vertically raised. The top part of the base frame 22 includes a support post 56 on a support post hinge 57. The support post 56 is a pivoting, extending appendage. When raised vertically the support post 56 enables attachment of an elongated securing member 58 which is wrapped around both fork prongs 20 and the support post 56. This holds the fork prongs 20 vertically. The securing member 58 can be any suitably durable and flexible cord, cable, chain, or bungee cord. As best illustrated in FIG. 1, when not being used to vertically retain the fork prongs 20 the support post 56 are folded down to allow it to nest within a support post recess 23 that is molded into the base frame 22.

As best shown in FIGS. 2 and 6 each fork prong 20 includes the front fork roller 60 and the rear fork roller 62. The front fork roller 60 attaches to the fork prong 20 using a lever arm 72 and a pivot pin 74. The lever arm 72 and pivot pin 74 can cause the front fork roller 60 to move vertically, which causes the fork prongs 20 to rise upward to assist moving a load. Referring now to FIG. 1, each fork prong 20 includes a distally located roller opening 75 for receiving the front fork rollers 60 when the fork prongs 20 are lowered.

The front fork roller 60 can be moved down by the first pushrod 70 and by second pushrod 71 to lift the fork prongs 20. As previously noted the first pushrod 70 is acted on by the pump assembly 28. The first pushrod 70 travels within a bottom portion of the fork bracket 40. As the first pushrod 70 is moved its distal end contacts and moves the second pushrod 71, which resides within the fork prong 20. The first 70 and second 71 pushrods are configured to align along a common centerline when the fork prong 20 is horizontal.

The distal end of the second pushrod 71 ends in a clevis 76. The clevis 76 attaches to the lever arm 72 by a pin 101. Moving the first 70 and second 71 pushrods toward the end of the fork prong 20 pivots the lever arm 72 to force the front fork roller 60 down relative to the fork prong 20, thus lifting the fork prong 20. To lower the fork prongs 20 the first 70 and second 71 pushrods move away from the distal end of the fork prong 20. This allows the front fork roller 60 to move up relative to the fork prong 20.

The hinged 52 enables physical separation of the first 70 and second 71 pushrods when the fork prongs 20 are moved vertically. It should be understood that similar angular drive components such as a universal joint, a sliding coupling, or the like may be used with equal benefit, and as such should not be interpreted as a limiting factor of the foldable pallet jack 10.

The materials required to produce the foldable pallet jack 10 are readily available and well known. The majority of the components of the invention are beneficially made of aluminum, either machined formed. Standard manufacturing processes such as casting, extruding, cutting, welding, and fastening may be performed. Using aluminum (or a similar strong and light-weight material) for the base frame 22, the base platform 24, the fork prongs 20, the fork brackets 40, and the support plate 36 reduces the weight of the foldable pallet jack 10 while still offering the rigidity and durability required to handle heavy loads. Some components such as the hydraulic pump assembly 28 may require construction from steel due to the high internal pressures involved. Other components such as the wheels, rollers, handle, release valve mechanism, fasteners, and the like, would best be procured from wholesalers and manufacturers that deal in goods of that nature.

The preferred embodiment of the present invention can be used by the common user in a simple and effortless manner with little or no training. Using the foldable pallet jack 10 can be achieved by performing a series of steps (given below). However it can be appreciated that the operational steps can be performed in alternative order and as such the following operational descriptions should not be viewed as a limiting factor.

During use the fork prongs 20 can be adjusted to one (1) of a plurality of selectable width-adjusted positions. The fastener 46 is loosened or disengaged such that the fork bracket 40 is free to move. Each fork prong 20 can then be moved relative to the base frame 22 along the support plate 36. To do so the fork prong 20 is lifted slightly upwardly such that the fork bracket 40 is removed from its original bracket seat 38. Once removed the fork prong 20 can be slid along the support plate 36 to an appropriate position. Once the fork prong 20 is at a selected bracket seat 38, the fork bracket 40 falls into that bracket seat 38 and the fastener aperture 44 of the associated fork bracket 40 and the threaded fastener 46 of the associated bracket seat 38 are aligned for insertion and tightening of the fastener 46. Then the foldable pallet jack 10 can be used to lift and transport loads such as pallets in a conventional manner.

During storage of the foldable pallet jack 10 the fork prongs 20 are folded into a vertical position, preferably by moving the fork prongs 20 inward to the narrowest width-adjustable position. Each fork prong 20 is then folded upward about its hinged connection 52 to a vertical state. When vertical the proximal end of each fork prong 20 is positioned within a fork recess 54 of the cover 48 and the securing member 58 is wrapped around the fork prongs 20 and a vertical support post 56.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pallet jack, comprising:
a base platform;
a base frame extending over said base platform and further extending below said base platform;
a pump assembly mounted between said base frame and said base platform, said pump assembly configured to raise and lower said base frame;
a rear wheel assembly below said base platform;
a swivel connection attaching said rear wheel assembly to said base platform;
a support plate attached to and extending away from the bottom of said base frame, said support plate including a generally vertical, flat front with an upper edge;
a first fork bracket extending from said support plate;
a second fork bracket extending from said support plate;
a first fork prong attached to said first fork bracket by a first hinge;
a second fork prong attached to said second fork bracket by a second hinge; and,
a handle for operating said pump assembly;
wherein pumping said handle pushes the base frame upward;
wherein said first fork bracket and said second fork bracket are configured with inverted "U"-shaped front ends that attach to said support plate;
wherein said support plate comprises a plurality of recessed bracket seats disposed along said upper edge for receiving said first fork bracket and said second fork bracket front ends;
wherein the width between said first fork prong and said second fork prong is adjustable by locating said first fork bracket and said second fork bracket into different bracket seats;
wherein at least said first fork prong includes a rear fork roller adjacent said first hinge, and wherein said rear fork roller pivots into contact with a floor; and,
wherein said first fork prong and said second fork prong respectively fold vertically upright on said first hinge and said second hinge.

2. The pallet jack according to claim 1, wherein said handle pivotally connects to said pump assembly.

3. The pallet jack according to claim 1, wherein said handle includes a valve control handle in fluid communication with said pump assembly, wherein said valve control handle can release pressure in said pump assembly to lower said base frame.

4. The pallet jack according to claim 3, wherein said handle further includes a grip around said valve control handle.

5. The pallet jack according to claim 1, further including a locking pin passing through said first fork prong and said first fork bracket.

6. The pallet jack according to claim 1, further including a cover over said flat front and said upper edge.

7. The pallet jack according to claim 1, further including a fastener passing through said first fork bracket to lock said first fork bracket into a bracket seat.

8. The pallet jack according to claim 1, wherein at least said first fork prong includes a front fork roller.

9. The pallet jack according to claim 1, further including a hinged support post attached to said base frame.

10. The pallet jack according to claim 9, further including a securing member for entrapping said support post, said first fork prong, and said second fork prong when vertical.

11. A pallet jack, comprising:
- a base platform;
- a base frame extending over said base platform and further extending below said base platform;
- a pump assembly mounted between said base frame and said base platform, said pump assembly configured to raise and lower said base frame;
- a rear wheel assembly below said base platform;
- a swivel connection attaching said rear wheel assembly to said base platform;
- a support plate attached to and extending away from the bottom of said base frame, said support plate including a generally vertical, flat front having an upper edge configured with at least three bracket seats;
- a first fork bracket extending from a first bracket seat of said plurality of bracket seats;
- a second fork bracket extending from a second bracket seat of said plurality of bracket seats;
- a first fork prong attached to said first fork bracket by a first hinge;
- a second fork prong attached to said second fork bracket by a second hinge; and,
- a handle for operating said pump assembly;
- wherein pumping said handle pushes the base frame upward;
- wherein the separation between said first fork prong and said second fork prong depends on said first bracket seat and on said second bracket seat;
- wherein said first fork prong and said second fork prong respectively fold vertically upright on said first hinge and said second hinge; and,
- wherein said first fork prong includes a rear fork roller adjacent said first hinge, and wherein said rear fork roller pivots into contact with a floor when said first fork prong is vertical.

12. The pallet jack according to claim 11, wherein said handle includes a valve control handle in fluid communication with said pump assembly, wherein said valve control handle can release pressure in said pump assembly.

13. The pallet jack according to claim 12, wherein said handle further includes a grip around said valve control handle.

\* \* \* \* \*